H. M. LOFTON.
LATHE.
APPLICATION FILED MAR. 8, 1916. RENEWED MAR. 11, 1920.

1,338,742.

Patented May 4, 1920.
5 SHEETS—SHEET 1.

FIG. 1.

WITNESSES
Daniel Webster Jr
E. W. Smith

INVENTOR
Herbert M. Lofton
BY 
ATTORNEY

H. M. LOFTON.
LATHE.
APPLICATION FILED MAR. 8, 1916. RENEWED MAR. 11, 1920.

1,338,742.

Patented May 4, 1920.
5 SHEETS—SHEET 4.

H. M. LOFTON.
LATHE.
APPLICATION FILED MAR. 8, 1916. RENEWED MAR. 11, 1920.

1,338,742.

Patented May 4, 1920.
5 SHEETS—SHEET 5.

WITNESSES

INVENTOR
Herbert M. Lofton
BY
ATTORNEY

UNITED STATES PATENT OFFICE.

HERBERT M. LOFTON, OF CHATTANOOGA, TENNESSEE.

LATHE.

1,338,742.      Specification of Letters Patent.      Patented May 4, 1920.

Application filed March 8, 1916, Serial No. 82,798. Renewed March 11, 1920. Serial No. 365,097.

*To all whom it may concern:*

Be it known that I, HERBERT M. LOFTON, a citizen of the United States, and resident of Chattanooga, county of Hamilton, and State of Tennessee, have invented an Improvement in Lathes, of which the following is a specification.

The object of my invention is to provide a construction of machine lathe having capacity for rapid production of finished work, accomplished by providing suitable means for machining the work at a plurality of places at the same time. My object is further to so provide an organization of tool-holding and operated parts in combination with a common chuck or work-holder that end and lateral machining operations may be performed upon the work at the same time or in rapid succession, and different kinds of tools can be brought into successive operation by the employment of suitable adjustable turrets or tool-carrying devices. In general, my object is to provide a lathe of such character that one man may at one time perform a number of distinct operations upon the work which would ordinarily necessitate the use of a plurality of lathes or other tools and the corresponding loss of time of the machinist in performing successive operations upon the different tools, thereby enabling the finished work to be produced in a rapid manner and at a great saving of cost not only in labor but also in the investment in tools.

My invention consists in a novel construction of lathe embodying a chuck and rotor whereby the work may be extended from both sides of the chuck into position to be machined, and combining therewith adjustable tool-holding means in front and back of the chuck and rotor arranged for suitable adjustment in respect to the said chuck, and also one or more auxiliary adjustable tool-holders arranged transversely in respect to the alinement of the aforesaid tool-holders and chuck, said auxiliary devices adapted to perform parallel cutting along the length of the work, special shaping or forming, grooving, waving, and under-cutting, or any of these, said auxiliary tool-holder or holders being arranged in a transverse plane intermediate of the chuck and the front tool-holder first mentioned.

My invention also comprehends a machine of the general character above stated when the tool-holders are constructed in the form of turrets adapted to permit the different tools to be successively brought into operative position; and further, in providing a machine of the foregoing character when one of the auxiliary turrets is supported for provision of both longitudinal and transverse adjustment relative to the chuck and the work held thereby and having automatic means for controlling the movements thereof whereby special forms of work may be automatically machined.

With the above and other objects in view, the nature of which will be more fully understood from the description hereinafter, the invention consists in the novel construction of lathes as hereinafter more fully described and defined in the claims.

Referring to the drawings.

2 is the main frame or bed of the machine and is provided at substantially its middle portion with a rotor head or housing 3 in which the chuck 4 is adapted to rotate. Said bed is also provided at the left-hand or back portion with a horizontal guide bed 5 for the slide 6 carrying a turret 7, and also on the front or right-hand portion with a guide bed 9 for the slide 10 which carries the turret 11 through an intermediate transversely movable slide 29$^a$. In addition to these main portions of the machine, there is interposed between the guide bed 9 and its slide 10 on the one part and the rotor on the other, a bed 32 bolted fast to the main bed 2 and providing suitable guides and slides for the turrets 13 and 14, the former with capacity for transverse movement to the length of the lathe or axis of rotation of the chuck, and the latter with capacity for both lateral and longitudinal adjustment, means for which will be described in detail hereinafter.

Figure 2:
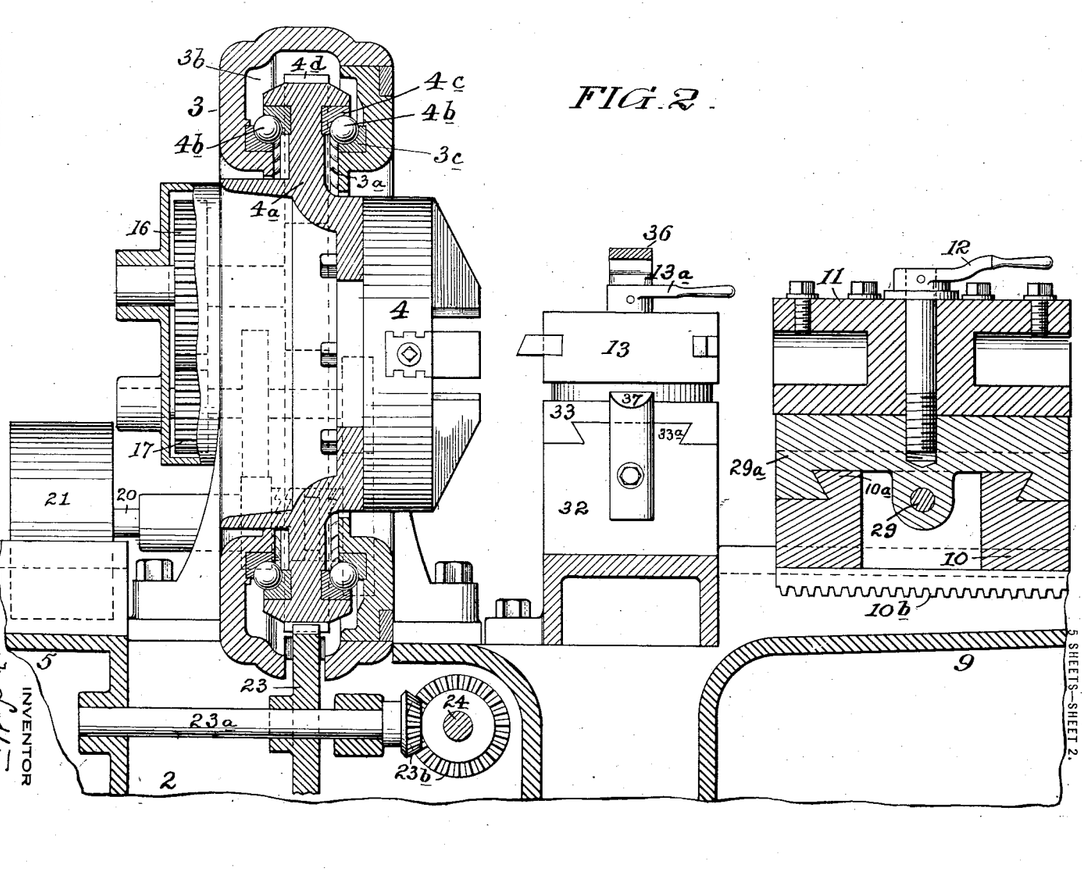
Fig. 2 is a sectional elevation of the middle portion of the lathe showing more particularly the construction of the rotor carrying the chuck.

Considering now more particularly the construction of the rotor and chuck, it will be seen by reference to Fig. 2 that the housing 3 is formed in annular shape and bolted upon the main bed 2 of the lathe. This housing is provided with an annular chamber $3^b$ having a radial slot on its inner portion as at $3^a$, and this housing may be in sections for more conveniently assembling the parts. 4 is the chuck and may be of any of the usual constructions. This chuck is bolted to an annular frame or rotor $4^a$ which has a radial flange extending through the annular slot $3^a$ of the housing, and its perimeter is provided with gear teeth $4^d$ by which it and the chuck may be rotated. The rotor is journaled in position by suitable ball bearings $4^b$ which are disposed between annular raceways $4^c$ on the rotor and $3^c$ on the housing. There is an annular set of the roller bearings $4^b$ on each side of the rotor, as will be clearly understood by reference to Fig. 2. In this manner, the rotor is free to rotate with a minimum friction and eliminates the use of the regular head stock such as is commonly employed on lathes. It will be noted that the rear middle portion of the rotor is recessed so that the tools may reach close up to the chuck in the performance of their work, and in this manner permit work of relatively short length being made in the lathe with both ends machined by tools in the turrets upon each side of the chuck. It will be seen from the construction that the bearings for the rotor are concealed and protected against dirt and dust, and moreover, that the bearing for the rotor is of such large diameter that the stability of the rotor as well as its accuracy in rotation are positively assured. It will also be understood that because of the great diameter of the roller bearings, the leverage exerted against transverse thrust upon the work by the tools of the auxiliary turrets 13 and 14 offers a proper resistance against any springing or displacement of the rotor and the work held thereby, and consequently insures the most accurate results. Any lost motion in the roller bearings may be taken up in any suitable manner by adjustment of the multiple part housing carrying the roller raceways.

Figure 3:
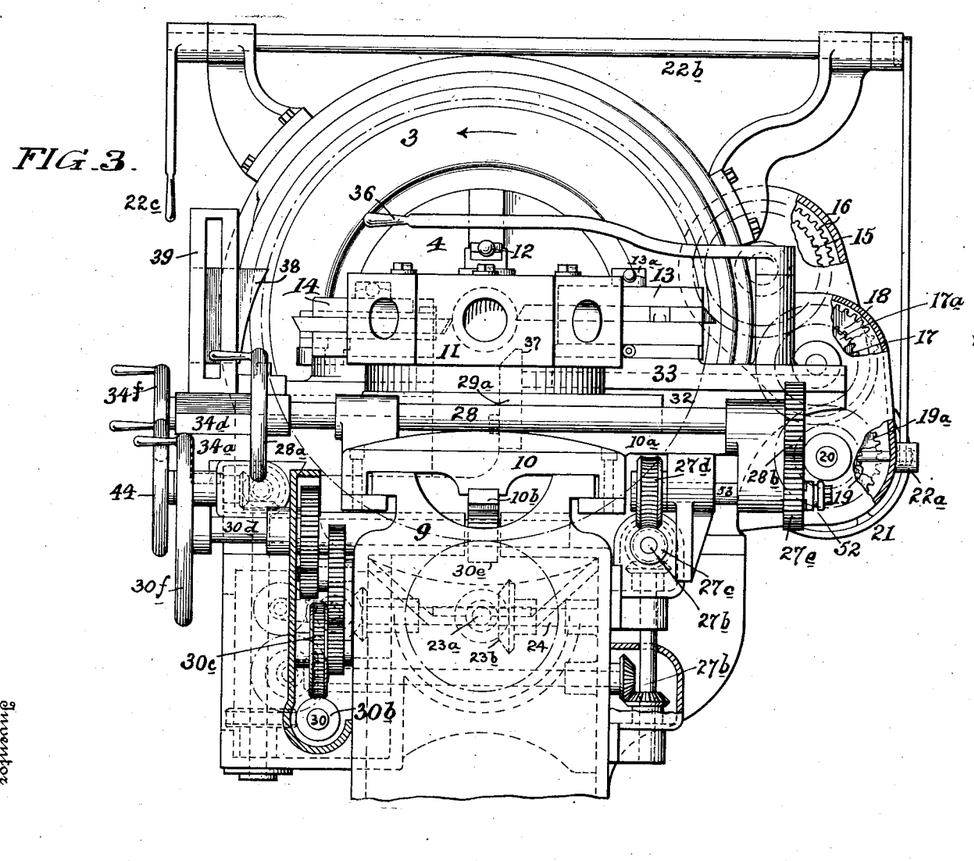
Fig. 3 is an end elevation of my improved lathe with portions broken away.
Figures 7, 8:
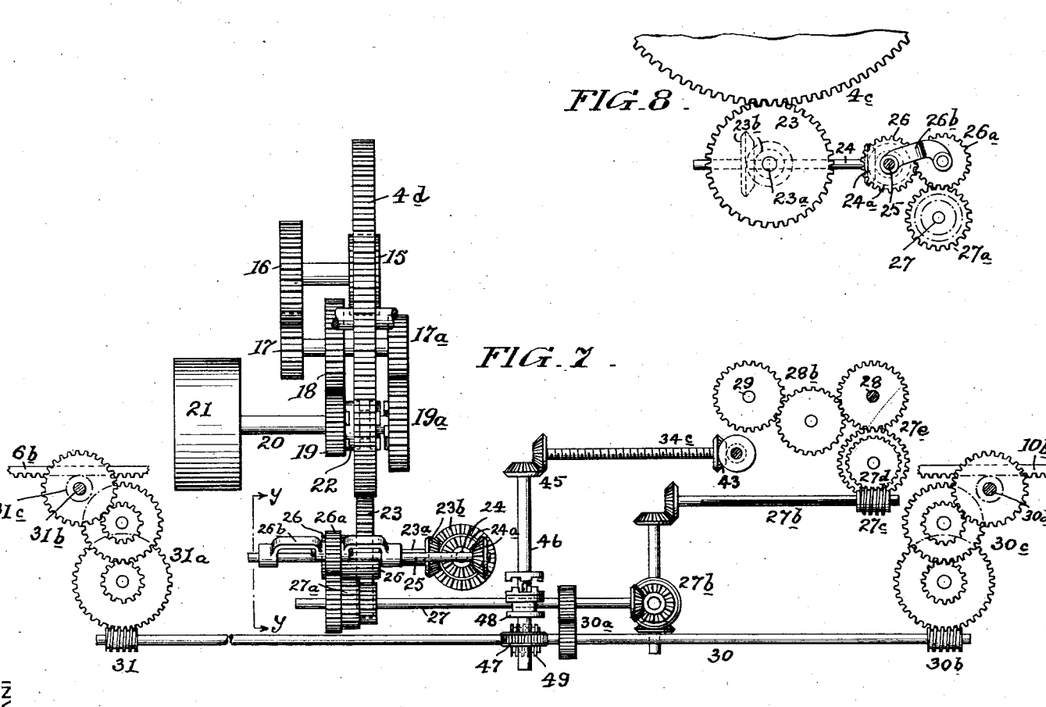
Fig. 7 is a diagrammatic or skeleton view illustrating the various driving shafts and gears for operating the several portions of the machine.
Fig. 8 is a sectional elevation of a portion of the same taken on line $y$—$y$ of Fig. 7.

To drive the rotor, suitable gearing is provided which is shown more fully in Figs. 3 and 7. The gear $4^d$ of the rotor is driven by a pinion 15, which in turn is driven by a gear 16, this latter gear being driven from the band pulley 21 through the shaft 20 and gears 17, 18 and 19. The gear 19 is driven from the shaft 20 through a suitable clutch 22. In addition to these gears, the shaft upon which the gears 17 and 18 are secured is also provided with a gear $17^a$, and this meshes with a gear $19^a$ upon the shaft 20, and with which it may be mechanically connected by the clutch 22, the latter being adapted for connecting the shaft 20 with either of the gears 19 or $19^a$, but not both at the same time. This clutch may be operated by the handle $22^c$, the rock shaft $22^b$ and suitable connections $22^a$ leading to the clutch, but I do not limit myself to any particular means for operating this clutch. By shifting the clutch, the rotor may be run at a slower speed when the clutch engages the gear 19 than when the clutch is thrown into engagement with the gear $19^a$. The rotor may be run in either direction as may be desired in any of the usual ways of operating lathes, and while the provision mentioned above for changing the speed of the rotor would give two speeds, the speeds may be increased or decreased by changed gear boxes in the usual way, the changes taking place between the gears 16 and 17, and I therefore do not limit myself to any of these minor details, as the ordinary commercial practice may be employed.

The various slides and turrets may be automatically operated from the power devices employed to operate the rotor, and to secure these results the gear $4^d$ of the rotor may drive a gear 23 secured on a shaft $23^a$ below the rotor housing. The shaft $23^a$ is arranged to drive a transverse shaft 24 through suitable bevel gears $23^b$. The shaft 24 is arranged to drive a longitudinal shaft 25 through the bevel gears $24^a$, and upon which is secured a gear 26 of relatively great length. Meshing with the gear 26 is a change gear $26^a$, the same being carried in a sliding shifter frame $26^b$ which is slidably hinged upon the shaft 25 whereby the gear $26^a$ maintains its geared relation with the gear 26 but may be shifted longitudinally thereon and circumferentially about its axis. The gear $26^a$ may be brought into meshed relation with either one of the cone gears $27^a$ which are secured upon the longitudinal shaft 27. By this means of adjustment, the shaft 27 may be rotated at either of three speeds for each speed of the rotor, and any change in the speed of the rotor by adjustment of its driving gears will also commensurately increase or decrease the speed of rotation of the shaft 27 and all the mechanism driven thereby. In this way the speed of adjustment of the various cutting tools will be proportional to the speed of the rotor.

The turret 11 has its tool-holding sockets in the same horizontal plane as the axis of the chuck and may be adjusted upon the tool slide $29^a$ about a vertical axis and clamped in position by the hand clamp 12. The general construction of the turret may be similar to those already in commercial use. The slide $29^a$ is guided upon the transverse guide $10^a$ of the slide 10, and is adapted to be adjusted transversely by means of a screw 29 journaled on the slide frame 10. This feed screw 29 may be operated by the hand wheel 28$^a$ through the medium of the transverse shaft 28 and gearing 28$^b$ (Fig. 3). The feed screw 29 may also be automatically operated from the shaft 27 by means of the train of gearing 27$^b$, the worm 27$^c$, worm wheel 27$^d$, and gear 27$^e$, which latter engages the train of gearing 28$^b$. Any suitable form of gearing may be employed if so desired. A suitable clutch means may be employed for throwing the automatic feeding gearing out of action upon the feed screw 29, when desired. Such a clutch may be arranged at 52 (Fig. 3) for connecting or disconnecting the gear 27$^e$ with the shaft 53 carrying the worm wheel 27$^d$, and such clutch may be made of any suitable character. Ordinarily, when the turret head is brought to a central position in alinement with the axis of the chuck, the operation of the feed screw will not be necessary, as the longitudinal feeding of the bed 10 will be relied upon for reciprocating the turret head to and from the chuck. To provide this longitudinal feeding of the slide 10, it is provided with a rack 10$^b$ with which a pinion 30$^e$ engages, said pinion secured to a transverse shaft 30$^d$ which may be operated by a hand wheel 30$^f$ or by power from the shaft 27 through a train of gearing, as follows: The shaft 27 is geared to a longitudinal shaft 30 by means of the gears 30$^a$; the shaft 30 is provided with a worm 30$^b$ which operates a worm wheel and train of gears 30$^c$ which leads to and drives the shaft 30$^d$. In this manner the slide 10 may be fed automatically by the power means of the lathe and its speed may be commensurate with the rotation of the rotor and chuck as before explained. The power transmission from the shaft 30 to the shaft 30$^d$ may be put into and out of action by the hand operated mechanism 50 which interrupts the action of the train of gears 30$^c$, as will be well understood by reference to Fig. 1. In this manner the slide may be either operated by hand or by power.

Considering now the turret 7 and the means for operating it, the said turret is pivoted on a vertical axis and carried by the slide 6 to and from the open rear space of the rotor at the back of the chuck, and the turret may be adjusted about its vertical axis and clamped in adjusted positions by the hand clamp 8. The slide 6 is provided with a rack 6$^b$ which is driven by a pinion 31$^c$ on transverse shaft 31$^b$ and the train of gears 31$^a$, in turn driven by the worm 31 on the shaft 30, similar in all material respects to the manner of feeding the slide 10. It is similarly provided with a hand mechanism 51 to put the automatic gearing into and out of operation. When desired, the slide 6 may be fed by a hand wheel 31$^d$ upon the transverse pinion shaft, all of which will be readily understood by reference to the drawings, Figs. 1 and 7. The gearing for operating the slides 6 and 10 may be such that the slides when automatically operated at the same time may be moved in the same direction, and may be reversed by reversing the rotor and chuck. In some characters of work such as screw threading, the turret 11 and turret 7 would be operated alternately, and between the operations the chuck and rotor would be reversed so that the work would turn in a right-hand direction with respect to each of the turrets and the tools carried thereby. In some cases, however, the tools of the turret 7 may be formed for left-hand work, in which case the work may be operated upon by the tools of both of the turrets 7 and 11, one at least being controlled by hand manipulation, these changes, however, relating to the special manipulation of the tool rather than to the particular construction thereof.

I will now consider the auxiliary turrets 13 and 14 and the means for operating the same. The turret 13 is pivoted on a vertical axis to the slide 33 which has capacity for transverse adjustment upon the guide 33$^a$ on the bed 32. The slide 33 is provided with a pinion 35 arranged to be rotated by a hand lever 36, the pinion engaging a rack 34 on the guide 33$^a$. By swinging the lever 36, the turret 13 may be shifted laterally into or out of cutting positions. This turret head 13 is thus provided with a transverse movement to the axial line of the chuck and the rotating work, and the tools carried by the chuck may be of a character suitable for special forming, grooving, waving, and under-cutting, or other suitable treatment of the work, and this may be accomplished by the tools inverted as indicated in Fig. 3 to suit the direction of rotation of the work at the front of the chuck. The turret may be clamped in position by the hand clamp 13$^a$. The extent of the movement toward the work may be limited by a stop indicated at 37 against which the slide 33 carrying the turret is brought to rest and to a definite point against the stop or work without using special calipers for determining the extent of the cutting as the work progresses; it being understood that the stop 37 is interchangeable with other stops each being arranged to permit just the definite amount of feed to the auxiliary turret 13 and its slide 33 to accomplish the work required and allow a rapid feeding of the turret without fear of over cutting or machining the work.

The turret 14 is more particularly for tools for parallel turning of the work or for producing special classes of work requiring either a taper or special variations in diameter. The general construction of this turret 14 is more fully shown in Figs. 4, 5, and 6, and to which reference will be made. Upon the bed 32, there is provided a longitudinal guide 34$^a$ and upon this guide there is slide 34$^d$ which is adapted to be fed longitudinally of the lathe by means of a feed screw 34$^c$. The slide 34$^d$ is in turn provided with a transverse guide 34$^f$ upon which is guided an auxiliary slide 34$^e$ said slide being adjustable transversely to the axis of the chuck by an adjusting screw 34$^b$ operated by a suitable hand wheel. The turret 14 is pivoted to the auxiliary slide 34$^e$ and rotatable about a vertical axis and is adapted to be clamped in adjusted positions by the hand clamp 14$^a$. It will thus be seen that the turret 14 is so supported that it may be adjusted longitudinally of the machine as well as transversely, so that it has capacity for turning the work parallel to its axis as well as shaping it by special transverse adjustments during the longitudinal cutting. The longitudinal adjustment of the slide 34$^d$ by means of the feed screw 34$^c$ may be accomplished by the hand wheel 44 through the gearing 43 or may be automatically accomplished by means of the following instrumentalities more fully shown in Figs. 1 and 7, to wit:— A worm 49 is secured to the shaft 30 and drives a worm wheel 47. A shaft 46 is geared to the screw feed shaft 34$^c$ by the bevel gears 45. The shaft 46 may be driven from the worm wheel 47 through the clutch 48, or it may be disconnected as desired. When disconnected it may be operated by the hand wheel 44, as before stated. Any suitable clutch mechanism or means of operating it may be employed, that shown being more diagrammatic than as a limitation of the details of construction.

Figure 1:
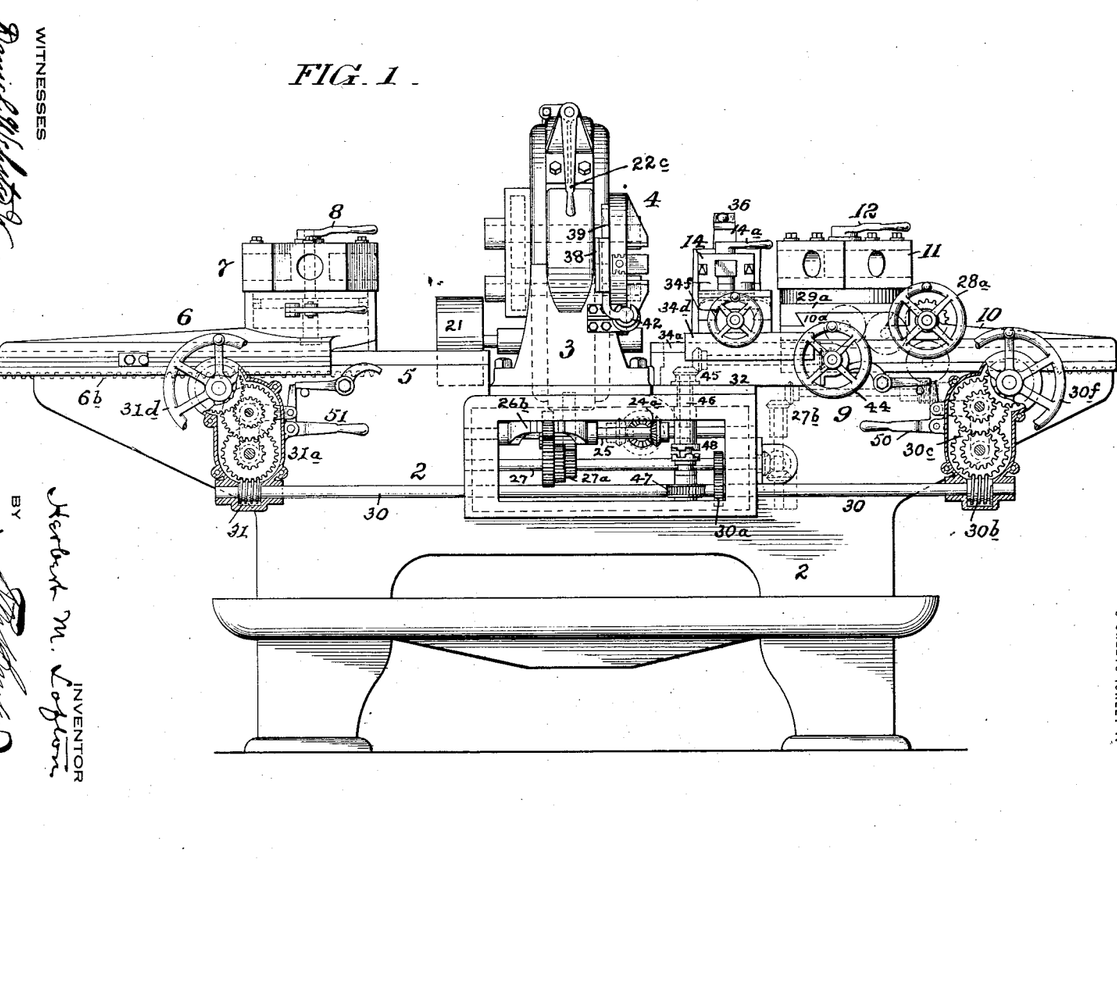
—Figure 1 is a side elevation of a lathe embodying my improvements.
Figure 4:
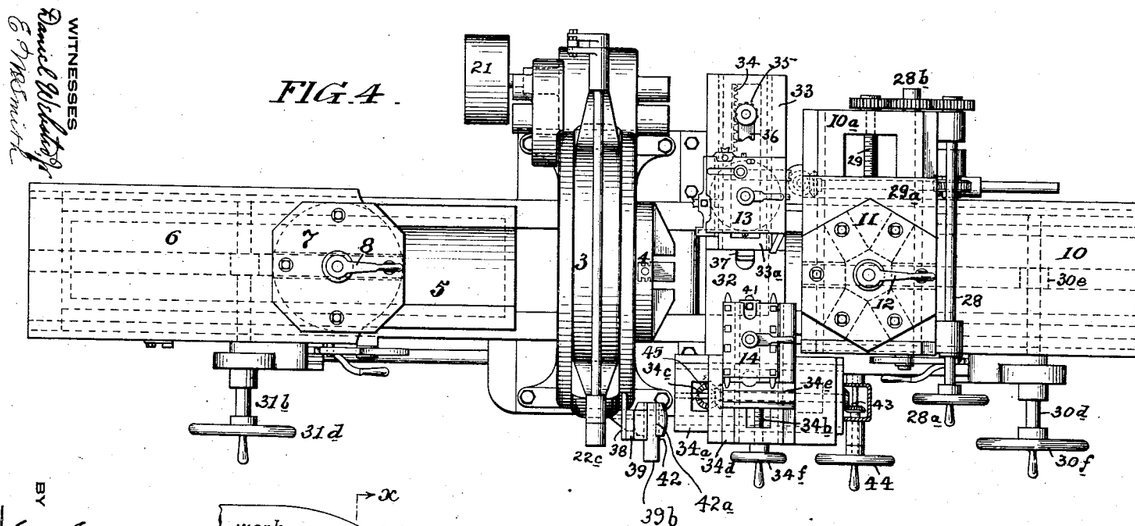
Fig. 4 is a plan view of the lathe.
Figure 5:
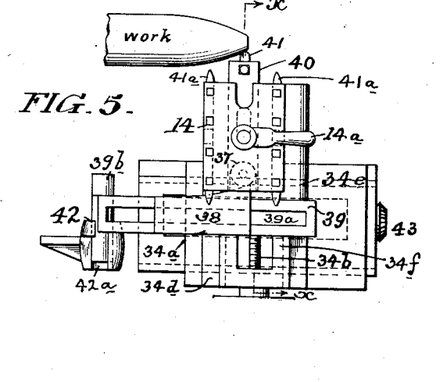
Fig. 5 is an enlarged plan view of a portion of Fig. 4 showing one of the auxiliary turrets in operation for cutting special forms.
Figure 6:
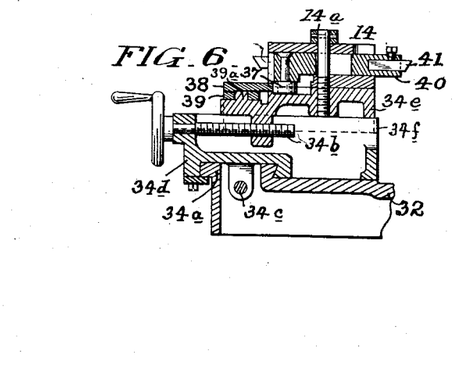
Fig. 6 is a sectional elevation taken on line $x$—$x$ of Fig. 5.

The turret head 14 is shown as provided with tools only at two of the opposite ends, and the outer tools 41$^a$ may be for simple turning or for ordinary parallel turning, whereas the tool 41 is so supported as to have an auxiliary or additional movement for the special turning, as will be understood by reference to Fig. 5. The holder 40 for tool 41 is arranged to slide through the turret 14 and has its opposite end provided with a roller 37 which is actuated by a cam 38 when the turret is fed longitudinally of the machine. The cam 38 is a templet which actuates the slide 40 and the cutting tool 41 carried thereby so that the shape given to the work will correspond to the shape of the templet against which the roller 37 presses. This templet cam 38 is secured to an arm 39 which is hinged to a bracket 42 in such manner that it has capacity for a sliding motion axially of the hinge to compensate for any adjustment which may be given to the slide 34$^e$ to or from the work in bringing the tool into proper cutting relation therewith. The arm 39 is made with an aperture or recess which fits down over a lug or projection 39$^a$ on the slide 34$^e$ so that said arm when turned into engaging position with said lug (Figs. 5 and 6), moves with the slide 34$^e$ as a unit to and from the work but is held against longitudinal movement with the said slide when the same is traversed longitudinally of the work by the feed screw 34$^c$. As the arm 39 is held against longitudinal movement so is the cam or templet 38, and consequently the roller 37 is made to traverse the cam or templet when the slide 34$^e$ and its turret head 14 are fed parallel to the length of the arm 39 by the feed screw 34$^c$. In this way the tool holder 40 and the tool 41 are given a special transverse adjustment corresponding to the templet cam, so that the work is turned to a shape corresponding to the templet, and without any special care on the part of the machinist to gage his work as he proceeds. The accuracy of the results is absolutely assured by the automatic operation of the mechanism employed. When parallel turning alone is required, the arm 39 carrying the cam 38 is turned up into a vertical position as indicated in Figs. 1 and 4, and at this time is out of control of the turret 14 or its slide. The tool 41 is then out of action by the holder 40 being moved backward so as to spring the turning tools 41$^a$ into advance position for work. The hinge for the arm 39 consists of the transverse pin 39$^b$ fitting into a slotted bearing 42$^a$ in the bracket 42, the construction being such that the pin 39$^b$ may slide through the bearing to any degree required without disconnection, so that the thrust of the roller 37 upon the cam cannot displace the cam, since it is anchored by its hinge connection with the bracket 42, which latter is bolted firmly to the housing of the rotor.

While the turrets 7 and 11 are specially intended for machining the ends of the work carried by the chuck, it is manifest that the capacity for transverse or cross feeding of the turret 11 would also permit a suitable tool to be held by the turret and traversed across the work in facing it where necessary. It is also evident that while I have only shown the transverse feeding as applied to the turret 11, the mounting of the turret 7 may be similar to turret 11 and the gearing duplicated, if it is desired to give more capacity to the machine though ordinarily this would not be necessary. The facing of the work held by the chuck may also be accomplished by the tools 41$^a$ of the turret 14 under the control of the hand feed screw 34$^b$, but in this case the turret would be rotated a quarter of a revolution and clamped in such adjusted position. With a machine of the character here described, various characters of work can be machined on the sides and ends which project from each side of the chuck whether the work is long or short; and furthermore, the operations may be conducted at the same time or in close succession without disturbing the work in the lathe. It is of course manifest that if the end of the spindle were being shaped as indicated in Fig. 5, the turret 11 could not be simultaneously employed to turn and thread an end thereto until the turret 11 were withdrawn to permit the advance of the tool of the turret 11, but nevertheless at this time the turret 7 may be employed with the turret 14 in machining the article. Similarly, the turrets 7 and 11 may be operated at the same time upon the work, and in association with these, the turret 13 may also be hand manipulated so that the performance of its operation upon the work may be carried on simultaneously with that on the ends of the work. Likewise it is manifest that where the arm 39 and the templet cam 38 are swung up out of the way of the slide 34$^e$, the turret 14 may be operated to turn the body of the work simultaneously with the action of the turrets 7 and 11 or either of them, and in some instances in conjunction with the operation of the turret 13, though ordinarily the turret 13 would be made to operate upon the work after the action of the turret 14 has been completed. The use of these various parts would be varied to suit the requirements of the work to be accomplished, and in accordance with the best judgment of the operator in charge.

In operation a piece of work is chucked in the usual way and the rotor started in the proper direction by the usual belts, and the turrets with the proper tools affixed are manipulated on either or both sides of the chuck for boring or turning or for doing such operations as are required and possible. Assuming that the work in the machine will require a greater number of turnings, then the turret head 14 is also fed up by the hand feed screw 34$^b$ to the desired position and the traversed motion is then accomplished by the feed screw 34$^c$. If the work to be machined will require special forming, grooving, or undercutting, it will be seen that this class of work is taken care of by the auxiliary turret head 13 which is fed into the work by means of the lever 36, and by the use of the stop 37 the extent of this cutting may be accurate and quickly done. Furthermore, as previously stated, where special turning is required for taper or curved forms on the spindle being turned, this may be accomplished by bringing into the operation the cam templet 38 and the tool-holder 40 with its tool 41. In this manner there are five operations or turnings possible upon the same piece of work without disturbing its chucked position.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention as expressed in the claims.

Having now described my invention, what I claim as new and desire to secure by Letters Patent, is:—

1. In a lathe, a main bed, combined with a chuck journaled thereon, a main slide movable to and from the chuck, an auxiliary slide carried by the main bed and movable parallel to the axis of the chuck, but arranged to one side of the chuck and out of alinement with the main slide, a tool-holding slide adjustable upon the auxiliary slide transversely to the axis of the chuck, an adjustable tool-holder carried by the tool-holding slide and movable therewith transversely to the axis of the chuck and said tool-holder adjustable relatively to the tool-holding slide about a vertical axis, adjusting devices for adjusting the tool-holding slide transversely upon the auxiliary slide, automatic feeding devices for feeding the auxiliary slide, and cam devices arranged in the path of the tool-holder for causing it to be automatically shifted transversely to the axis of the chuck during the longitudinal traversing movement of the auxiliary slide, said devices comprising a hinged bar, the hinge of which is formed upon the main frame and the bar movable in the direction of the axis of the hinge, a guide upon the tool-holding slides for maintaining the hinged bar parallel to the axis of the chuck, and a cam secured to the hinged bar for operating upon the tool-holder.

2. In a lathe, a main bed, combined with a chuck journaled thereon, a main slide movable to and from the chuck, an auxiliary slide carried by the main bed and movable parallel to the axis of the chuck, but arranged to one side of the chuck and out of alinement with the main slide, a tool-holding slide adjustable upon the auxiliary slide transversely to the axis of the chuck, an adjustable tool-holder carried by the tool-holding slide and movable therewith transversely to the axis of the chuck and said tool-holder adjustable relatively to the tool-holding slide about a vertical axis, adjusting devices for adjusting the tool-holding slide transversely upon the auxiliary slide, automatic feeding devices for feeding the auxiliary slide, and cam devices arranged in the path of the tool-holder for causing it to be automatically shifted transversely to the axis of the chuck during the longitudinal traversing movement of the auxiliary slide, said devices comprising an upwardly extending guide rib on the tool-holding slide, said rib parallel to the axis of the chuck, a slotted bar hinged to the bed on an axis transverse to the axis of the chuck and adapted to be turned up out of operation or down into a horizontal position into engagement with the guide rib, and a cam secured to the slotted bar for operating the tool-holder.

3. In a lathe, the combination of a bed, a chuck journaled thereon intermediate of the ends and open at both front and back to expose the opposite ends of the work, a main turret in front of the chuck, a main turret at the rear of the chuck, means for moving the turrets to or from the chuck, two auxiliary turrets respectively arranged upon opposite sides of the axis of the chuck and between said chuck and one of the main turrets, guides for guiding one of the auxiliary turrets transversely to the axis of the chuck and preventing longitudinal movement, guides for guiding the other of the auxiliary turrets transversely to the axis of the chuck and also longitudinally thereof, separate hand feeding devices for independently feeding the auxiliary turrets to and from each other transversely to the axis of the chuck, and feeding means for feeding the longitudinally movable auxiliary turrets parallel to the axis of the chuck independently of the other of said auxiliary turrets.

4. In a lathe, the combination of a bed, a chuck journaled thereon intermediate of the ends and open at both front and back to expose the opposite ends of the work, a main turret in front of the chuck, a main turret at the rear of the chuck, means for moving the turrets to or from the chuck, two auxiliary turrets respectively arranged upon opposite sides of the axis of the chuck and between said chuck and one of the main turrets, hand feeding devices for independently feeding the auxiliary turrets to and from each other transversely to the axis of the chuck, feeding means for feeding longitudinally movable auxiliary turrets parallel to the axis of the chuck, a sliding tool-holder carried by the auxiliary turret having the capacity for longitudinal feeding, and adjustable cam templet devices for automatically imparting a sliding motion to the tool-holder transversely to the axis of the chuck during the longitudinal feeding adjustment of the auxiliary turret.

5. In a lathe, the combination of a bed, a chuck rotatably mounted thereon, a main slide and turret in front of the chuck, said turret adjustable on a vertical axis, feeding devices to move the main slide and turret toward and from the chuck, an auxiliary slide and turret arranged between the chuck and the main turret, means to adjust the auxiliary slide and turret transversely to the axis of the chuck, and feeding devices for feeding the auxiliary slide and turret parallel to the axis of the chuck, said means arranged out of alinement with the main slide and turret and to one side of the bed.

6. In a lathe, the combination of a bed, a chuck rotatably mounted thereon, a main turret in front of the chuck, feeding devices to move the main turret toward and from the chuck, an auxiliary turret arranged between the chuck and the main turret, means to adjust the auxiliary turret transversely to the axis of the chuck, feeding devices for feeding the auxiliary turret parallel to the axis of the chuck, a second auxiliary turret also arranged between the chuck and the main turret and upon the opposite side of the axis of the chuck to which the first mentioned auxiliary turret is arranged and positively held against longitudinal movement parallel to the axis of the chuck, and separate means for imparting a transverse feeding motion to the last mentioned auxiliary turret to and from the axis of the chuck.

7. In a lathe, the combination of a bed, a chuck rotatably mounted thereon, a main turret in front of the chuck, feeding devices to move the main turret toward and from the chuck, an auxiliary turret arranged between the chuck and the main turret, automatic means to adjust the auxiliary turret transversely to the axis of the chuck, feeding devices for feeding the auxiliary turret parallel to the axis of the chuck, a second auxiliary turret also arranged between the chuck and the main turret and upon the opposite side of the axis of the chuck to which the first mentioned auxiliary turret is arranged and independently movable relatively thereto, means for imparting a transverse feeding motion to the last mentioned auxiliary turret to and from the axis of the chuck, and stop devices for limiting the movement of the second auxiliary turret toward the first mentioned auxiliary turret and axis of the chuck.

8. In a lathe, the combination of a bed, a chuck rotatably mounted thereon, a slide guide arranged parallel to the axis of the chuck, a slide adjustably mounted on the guide, means to adjust the slide longitudinally on the guide, a tool-holding slide adjustably mounted upon the first mentioned slide and movable transversely to the line of adjustment thereof, adjusting devices for adjusting the tool-holding slide transversely to the axis of the chuck, an adjustable tool-holder carried by the tool-holding slide and movable transversely to the axis of the chuck, a cam templet for operating the tool-holder during the traversing motion thereof parallel to the axis of the chuck, and means for holding the cam templet against longitudinal movement during the traversing movement of the slides and tool-holder, said means comprising a hinged bar having its hinge next to the chuck and also adjustable in alinement with the axis of its hinge, and a long guide rib on the tool-holding slide engaging the bar for shifting it transversely to its length while holding it parallel to the axis of the chuck.

9. In a lathe, the combination of a bed, a chuck rotatably mounted thereon, a slide guide arranged parallel to the axis of the chuck, a slide adjustably mounted on the guide, means to adjust the slide longitudinally on the guide, a tool-holding slide adjustably mounted upon the first mentioned slide and movable transversely to the line of adjustment thereof, adjusting devices for adjusting the tool-holding slide transversely to the axis of the chuck, an adjustable tool-holder carried by the tool-holding slide and movable transversely to the axis of the chuck, a cam templet for operating the tool-holder during the traversing motion thereof parallel to the axis of the chuck, and a bar for holding the cam templet against longitudinal movement during the traversing movement of the slides and tool-holder, said bar shiftably mounted for adjustment to or from the axis of the chuck and slidably connected with the tool-holding slide, whereby it and the cam templet carried thereby are adjusted to and from the axis of the chuck commensurately with the adjustment of the tool-holding slide and at the same time permitting a longitudinal traversing motion of the latter and tool-holder relatively to the cam templet and a hinged connection between the bar and bed having a horizontal axis transverse to the axis of the chuck, whereby said bar may be raised out of engagement with the tool-holding slide.

10. In a lathe, the combination of a bed, a chuck rotatably mounted thereon, a slide mounted on the bed to have longitudinal motion parallel to the axis of the chuck, means for feeding the slide, an auxiliary slide carried by the first mentioned slide with provision for transverse adjustment thereon in a direction to and from the axis of the chuck, means to feed the auxiliary slide, a tool-holding head carried by the auxiliary slide and having two sets of cutting tools one set thereof adapted for being positively clamped in position on the head, a slidable tool-holder mounted in the head for the other cutting tool said holder movable toward and from the axis of the chuck, automatic cam operating means for shifting the tool-holder during the traversing of the slides and tool-holding head parallel to the axis of the chuck, and means for putting the cam devices out of operation when it is desired to use the tools fixedly held in the head for parallel turning.

11. In a lathe, the combination of a bed, a chuck rotatably mounted thereon, a slide adjustable on the bed to move parallel to the axis of the chuck, means to feed the slide, an auxiliary tool-holding slide adjustable on the first mentioned slide transversely to the axis of the chuck and having an engaging projection, an adjustable tool-holder carried by the auxiliary slide and movable toward and from the axis of the chuck, a hinged frame hinged to the main frame of the lathe and having a longitudinal guide portion for engaging the projection on the auxiliary tool-holding slide whereby it is moved therewith in its transverse adjustment, said frame being slidably connected at its hinge to permit lateral shifting while maintaining its hinged connection against longitudinal displacement, and a cam templet carried by said frame for operating the adjustable tool-holder.

12. In a lathe, the combination of a bed, with a chuck having an annular rotor frame of greater diameter than the chuck and providing access to the chuck from the rear as well as from the front said rotor having gear teeth about its perimeter and also outwardly directed lateral circumferential flanges, an annular housing providing an annular chamber in which the peripheral portion of the rotor extends, the portion on each side of the rotor next to the chuck formed with inwardly directed lateral flanges, roller bearings on each side of the rotor and between it and the housing and within the annular chamber thereof comprising annular seats fitting to the lateral flanges of the rotor and housing and balls between them, and power gearing engaging the peripheral gear of the rotor for rotating it and the chuck carried thereby.

13. In a lathe, a chuck, an annular rotor supporting the chuck and open at the rear so that access may be had to the chuck at the rear as well as in front, an annular housing inclosing the peripheral portion of the rotor and in which the rotor is annularly journaled, power devices arranged at the rear of the lathe engaging the rotor at its peripheral portion for rotating it, means for causing the power devices to operate the rotor at different speeds comprising a shaft geared to the rotor and having thereon two gear wheels of different diameters, a power shaft having thereon two loose gears of different diameters and meshing with the first mentioned gears so that a small gear meshes with a large gear, clutch devices for coupling the power shaft with either of the loose gears thereon, and hand operable means for shifting the clutch devices extending over the latch to the front thereof.

14. In a lathe, the combination of a bed, a chuck journaled thereon, a main slide and turret movable on the bed to and from the chuck, two auxiliary tool holders supported by the bed and arranged between the main slide and the chuck, one of said tool holders movable transversely to the axis of the chuck and held against longitudinal movement on the bed and the other of said tool holders adjustable upon the bed longitudinally of the axis of the chuck and also transversely thereto, independent adjusting devices for the tool holders, and automatic means movable transversely with the last mentioned tool holder and arranged to impart to it an additional transverse adjustment during its longitudinal adjustment.

In testimony of which invention, I hereunto set my hand.

HERBERT M. LOFTON.

Witnesses:
K. L. McCarthy,
T. P. Dickmann.